April 5, 1960     E. L. MAYO     2,931,179
AUTOMOBILE POWER BRAKES FOR MANUAL OR PEDAL OPERATION
Filed Dec. 3, 1957     7 Sheets-Sheet 4

INVENTOR.
Edward L. Mayo
BY Brown, Jackson,
Boettcher & Dienner
Atty's.

April 5, 1960 E. L. MAYO 2,931,179
AUTOMOBILE POWER BRAKES FOR MANUAL OR PEDAL OPERATION
Filed Dec. 3, 1957 7 Sheets-Sheet 7

INVENTOR.
Edward L. Mayo
BY
Brown, Jackson, Boettcher & Dienner
Atty's

2,931,179

AUTOMOBILE POWER BRAKES FOR MANUAL OR PEDAL OPERATION

Edward L. Mayo, Cleveland, Ohio, assignor to The Bishop and Babcock Manufacturing Company, Cleveland, Ohio, a corporation of Ohio Application December 3, 1957, Serial No. 700,459

12 Claims. (Cl. 60—54.5)

This invention relates to power braking systems for automotive vehicles, and has to do with a braking system operable by either manual or brake pedal control means through the full range of braking requirements, operable by foot pedal pressure with or without power braking, and particularly suitable for use with passenger automobiles though applicable, in its broader aspects, to automotive vehicles generally.

Power brakes for passenger automobiles are well known and rather extensively used. In all of such power brakes with which I am familiar braking is accomplished by pressure exerted by the foot upon the conventional brake pedal and, in general such systems are over-sensitive at lower and moderate speeds up to between approximately 30 to 45 miles per hour, due to the fact that much greater braking power is available than is required at such speeds, with the result that but slight pressure on the brake pedal results in an abrupt stop of the automobile. That is objectionable, especially in heavy traffic, because it frequently happens that a following automobile, particularly if not equipped with power brakes, is unable to stop in sufficient time to prevent a collision. The known power brakes above referred to include among other types what is termed a booster unit actuated by pressure from the master cylinder for connecting to the engine intake manifold a suction operated power motor which operates an auxiliary cylinder from which pressure is transmitted to the wheel brake cylinders. Other known types include a suction operated bellows controlled mechanically by positioning of the brake pedal and which exerts pressure on the master cylinder. The known power brakes referred to are so designed that the maximum braking power exertable by the booster is less than approximately fifty percent of that required for a crash stop at high speeds, and must be supplemented by substantial foot pressure on the brake pedal for effecting such stops. The purpose of that is to reduce the braking power to a value such that excess of power and resultant over-sensitivity in braking at lower speeds is lessened, while providing sufficient power, supplemented by foot pressure, for braking at the higher speeds.

My invention is directed to brake means which avoids the above noted objections to the present power brake systems. To that end I provide brake means which gives adequate braking power for crash stops at high speeds while avoiding over-sensitivity in braking at low or moderate speeds. In general the atmospheric braking pressure obtainable from a power braking motor connected to the intake manifold of a passenger automobile is approximately nine pounds per square inch. In the braking means of my invention I provide a suction operated motor having a diaphragm or movable wall of such area as to provide adequate power for braking to an abrupt or crash stop in case of emergency when travelling at high speed such as sixty miles per hour or more. In conjunction with that motor I provide means whereby a portion only of the total power thereof may be utilized for braking at the lower speeds, adequate for that purpose, and the total power of the motor may be utilized for braking at the higher speeds. That avoids excess of available braking power at the lower speeds thereby eliminating overbraking and oversensitivity and assuring smooth braking at such speeds, while providing a reserve of braking power for braking at higher speeds. In certain forms of my invention a portion only of the area of the movable wall of the motor is used for braking at the lower speeds, and the remaining portion of the area of that wall is added for braking at higher speeds. Operation of the brake means may be controlled either by hand or by the brake pedal, providing dual control brake means if desired. The braking means of my invention includes means whereby smooth braking is assured at all speed ranges, avoiding abrupt stops such as frequently occur with the present power brakes referred to, which are oversensitive at the lower speeds. Further objects and advantages of my invention will appear from the detail description.

Figure 1:
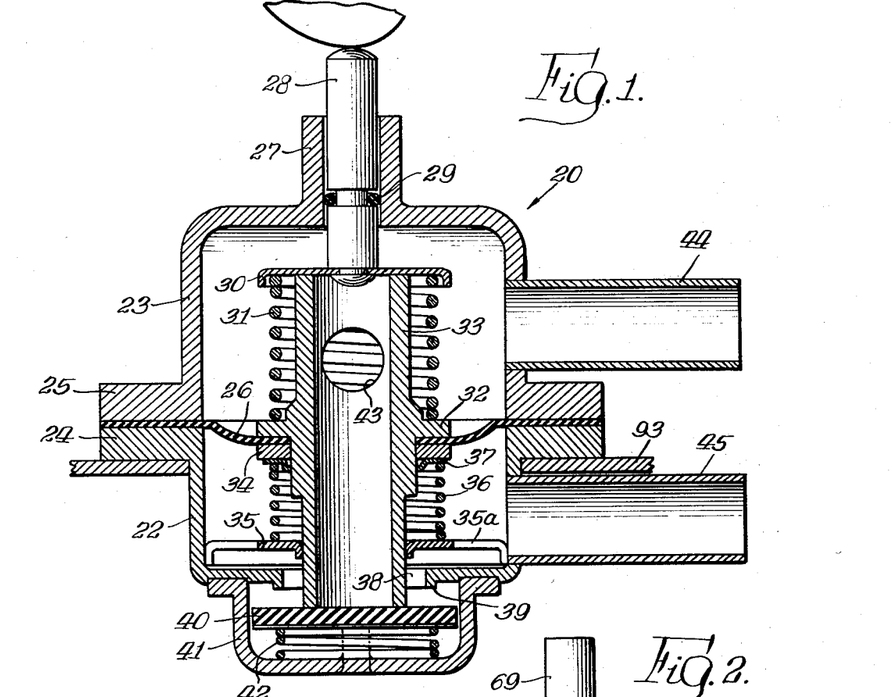
Figure 1 is an axial sectional view of one of the control valves used in the braking system of my invention, certain parts being shown in elevation.
Figures 3, 9, 10:
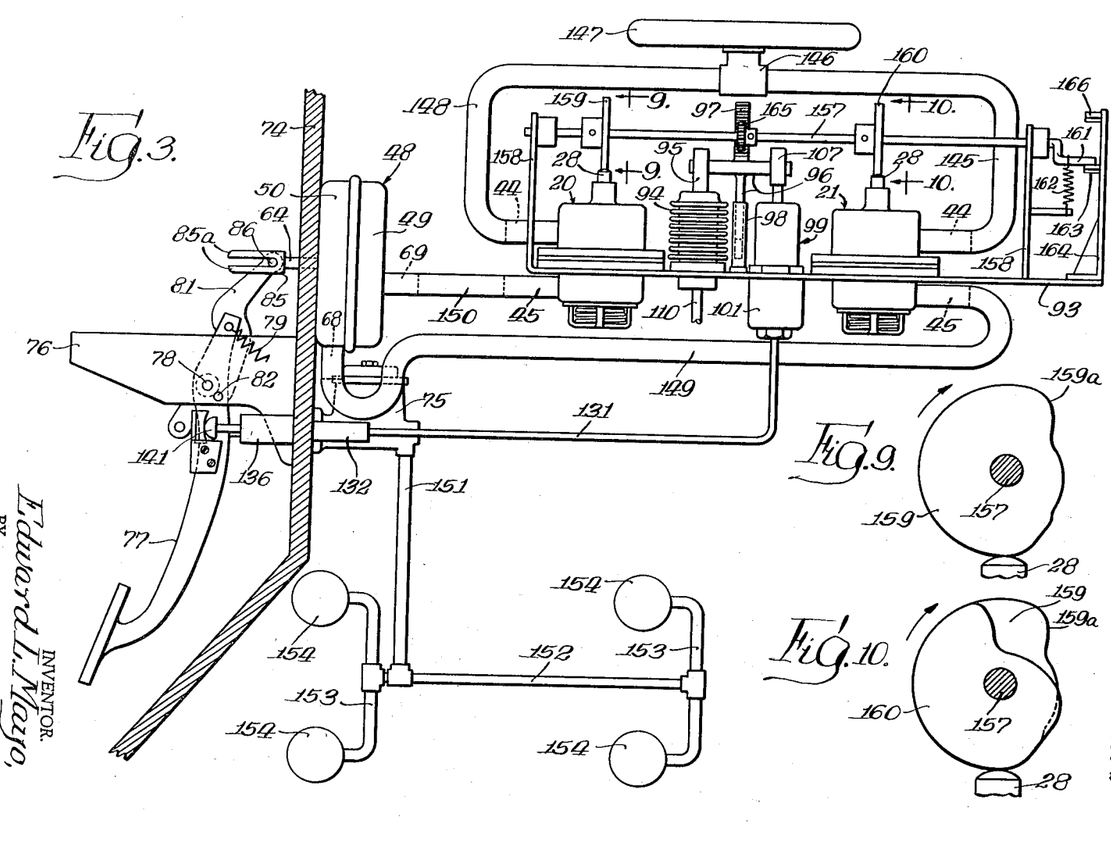
Figure 3 is a diagrammatic view of a braking system embodying my invention.
Figure 9 is a sectional view, on an enlarged scale, taken substantially on line 9—9 of Figure 3.
Figure 10 is a sectional view, on an enlarged scale, taken substantially on line 10—10 of Figure 3.

In the form of brake system shown in Figure 3 I provide two control valves 20 and 21 one of which, valve 20 for example, is shown in section in Figure 1. The control valves 20 and 21 are of the same construction and operation, each comprising a casing formed in two substantially cylindrical sections 22 and 23 having outwardly extending circumferential base flanges 24 and 25, respectively, bolted together and clamping between them the outer marginal portion of a flexible diaphragm 26 of suitable material. Casing section 23 is provided at its upper end with a neck 27 which slidably receives a plunger 28 having a circumferential groove receiving an O sealing ring 29 providing an air tight seal about plunger 28. A cup 30, secured to the inner end of plunger 28, receives the upper end of a compression spring 31 the lower end of which seats on an outer circumferential flange 32 of a tubular vacuum control valve member 33 disposed within spring 31 and also seating at its upper end in cup 30. The inner marginal portion of diaphragm 26 is clamped between flange 32 and a clamp ring 34 disposed at about the midlength of valve member 33 and secured thereto in a suitable manner, as by having a drive fit thereon. The lower portion of valve member 33 is slidable through a guide 35 secured in the lower portion of casing section 22 in a suitable manner, as by having a drive fit therein. A compression spring 36, lighter than spring 31, is disposed about valve member 33 and confined between guide 35 and a seat member 37 seating on ring 34. Casing section 22 is provided at its lower end with an air inlet port 38 concentric with, and of materially greater diameter than, valve member 33, and a valve seat element 39. The lower end of valve member 33 is accurately formed to provide a seat for an air intake disc valve member 40, formed of rubber or any suitable material, operable in an open valve cage 41 suitably secured, conveniently by welding, to the bottom of casing section 22. A compression spring 42, confined between the bottom of valve cage 41 and disc valve member 40, yieldingly urges the latter toward valve member 33 normally holding it seated thereon. When the vacuum control valve member 33 is in its normal brake releasing position, shown in full lines in Figure 1, disc valve member 40 is spaced from its seat element 39 admitting air, through port 38 and openings 35a in guide 35, to the casing section 22.

The vacuum control valve member 33 is provided with an opening 43 to the interior of casing section 23, which has a nipple 44 opening thereinto, and casing section 22 has a nipple 45 opening into it. As above noted the control valves 20 and 21 are of the same construction and operation and a detailed description of one thereof will suffice, and the same reference numbers are applied to the corresponding parts of the respective valves.

Figure 2:
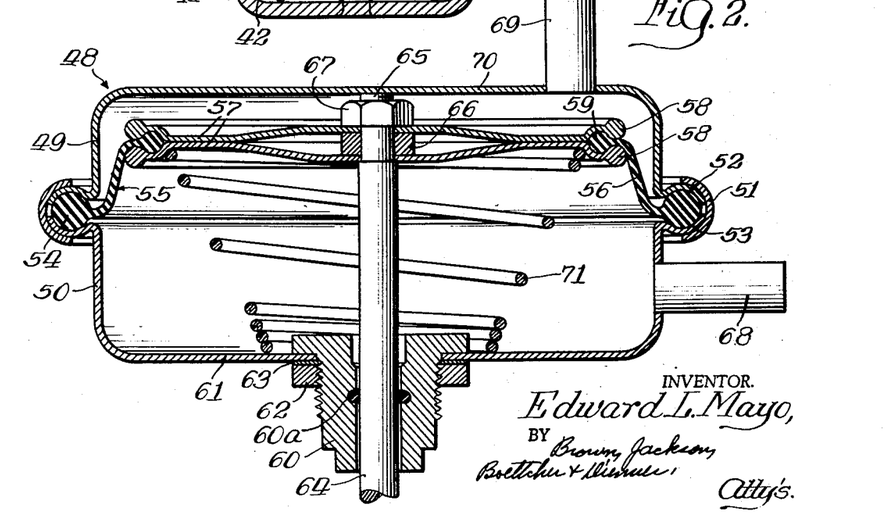
Figure 2 is an axial sectional view of the suction power motor used in one form of the braking system of my invention.

The control valve means of Figures 1 and 3, is used in connection with a suction operated power motor 48 shown more clearly in Figure 2. The motor 48 includes a housing formed in two sections 49 and 50 secured together by a clamp ring 51 engaging over arcuate circumferential flanges 52 and 53 of sections 49 and 50, respectively, the flanges 52 and 53 clamping between them a peripheral bead 54 of circular cross section integral with a diaphragm 55 comprising a rim portion 56 formed of rubber or other suitable material and two discs 57 together providing the head of the diaphragm. The discs 57 are provided with peripheral beads 58 of circular cross section and with offset peripheral portions defining between them a channel in which is clamped a bead 59 extending about the radially inner edge of the rim portion 56 of the diaphragm. A tubular fitting 60 is inserted through end wall 61 of casing section 50 and is provided at its inner end with an outer circumferential flange seating on the inner face of wall 61. Fitting 60 is clamped to wall 61 by a nut 62 threaded thereon, there being a washer 63 interposed between nut 62 and wall 61. A plunger 64 is slidably mounted through fitting 60 and is provided at its inner end with a reduced screw stud 65 upon which is threaded an outer nut 66 clamping the center of the outer disc 57 to plunger 64, and an inner nut 67 clamping the center of the inner disc 57 between the nuts 66 and 67. A nipple 68 opening into section 50 of casing 48 at one side thereof and a similar nipple 69 opening into section 49 through end wall 70 thereof provide means for connecting sections 50 and 49 of the motor casing to a source of suction, as will be explained presently. A spiral compression spring 71 is confined between discs 57 of diaphragm 55 and wall 61 of the motor casing and yieldingly urges the discs 57 and with them the plunger 64 inward of the casing. An O ring 60a in fitting 60 provides an air tight seal about plunger 64.

Figures 4, 5, 6:
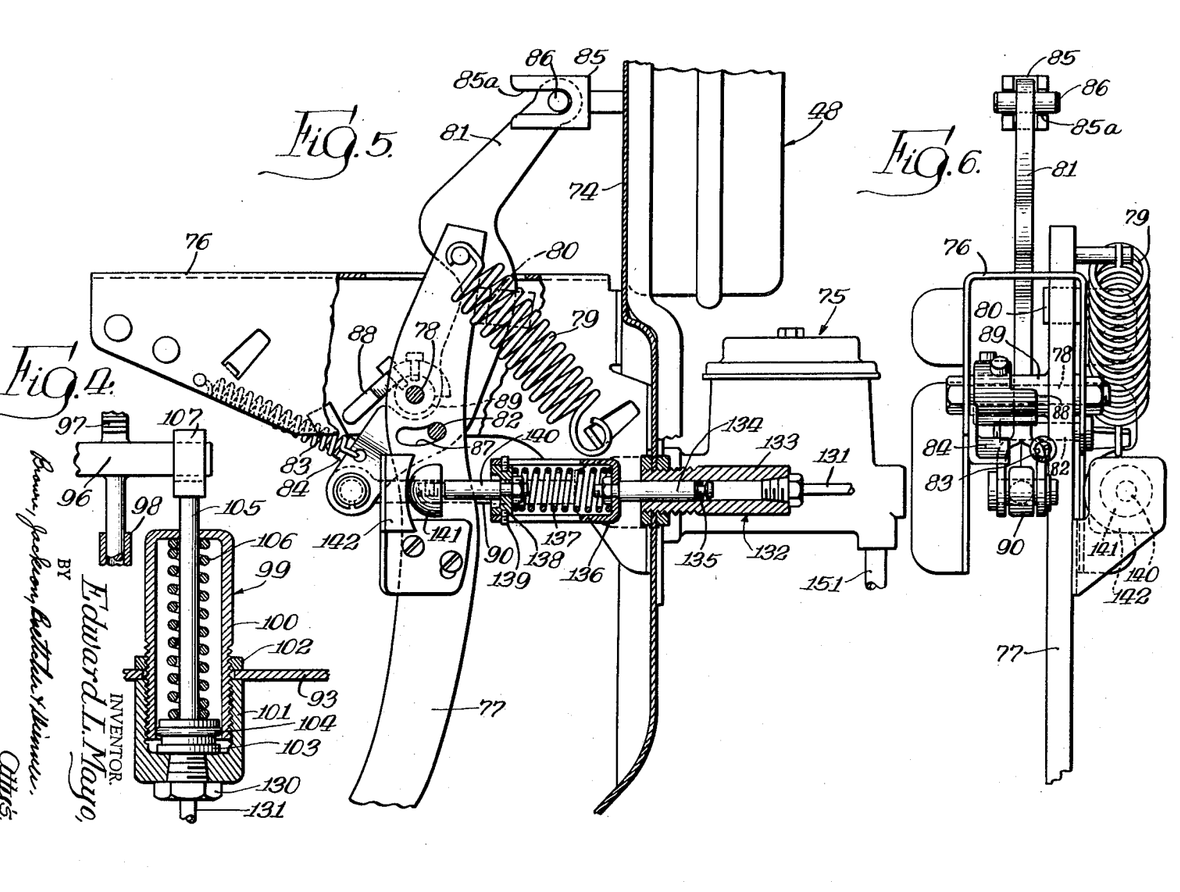
Figure 4 is an axial sectional view, on an enlarged scale, of the hydraulic cylinder for operating the control valve cam shaft of the system of Figure 3, certain parts being shown in elevation.
Figure 5 is a side view, on an enlarged scale, partly broken away and partly in section, of the brake pedal lever and suction power motor lever assembly and associated parts.
Figure 6 is a rear view, looking toward the fire wall, of the assembly and associated parts of Figure 5.

The suction operated motor 48 of Figure 2 is the operating motor of the braking system of my invention. It is mounted on the front of the fire wall 74 through which plunger 64 extends, as shown in Figures 3, 5 and 6. A master cylinder 75, of known type, also is mounted on the front of fire wall 74 of the automobile, to one side of and adjacent motor 48. A channel bracket 76 is mounted on the rear of fire wall 74 and receives a brake pedal lever 77 pivoted therein on a pivot pin 78. A tension spring 79, anchored at its lower end to bracket 76 and at its upper end to brake pedal lever 77, normally holds the latter in its raised or nonbraking position in contact with a stop 80 on bracket 76. A motor power lever 81 is pivotally mounted in bracket 76 on a pivot pin 82, at one side of brake pedal lever 77. Lever 81 is urged in clockwise direction by a tension spring 83 anchored thereto and to bracket 76 and normally holding lever 81 in contact with a stop 84 on bracket 76. A forked head 85 is secured on the rearward end of plunger 64 of motor 48. The arms of head 85 have lengthwise slots 85a extending from their outer ends, which loosely receive the ends of a cross pin 86 secured in the upper end of lever 81 and extending between the arms of head 85. The brake pedal lever 77 is provided with an arcuate slot 87, shown more clearly in Figure 5, which receives pivot pin 82 of lever 81 and permits movement of brake pedal lever 77 in braking direction independently of lever 81, as will appear more fully later. A pad or finger 88 is fixed to hub 89 of brake pedal lever 77. Normally cross pin 86 seats in head 85 of plunger 64, at the forward ends of the slots 85a and finger 88 is spaced above and in rear of the lower arm of lever 81, as shown in Figure 5. The lower end of lever 81 is pivoted to the rearward end of plunger 90 of master cylinder 75 for transmitting pressure to the wheel brake cylinders, as explained later.

Referring further to Figure 3, the two control valves 20 and 21 extend through a mounting plate 93 to which they are suitably secured, conveniently by bolting, in spaced apart relation. A metal bellows or Sylphon 94, of known type, is suitably mounted on plate 93 between valves 20 and 21. A fork 95 fixed on the upper end of bellows 94 receives one arm of the head 96 of a rack bar 97 of cruciform shape slidably mounted for vertical movement in a guide bracket 98 secured to, and extending upward from, plate 93. A hydraulic cylinder 99, shown more clearly in Figure 4, is mounted on plate 93, adjacent bellows 94, the two being disposed adjacent each other and between the valves 20 and 21. The cylinder 99 comprises a cylindrical barrel 100 threaded at its lower portion for reception of a closure cap 101 and a clamping nut 102. A piston 103 slidable in barrel 100 carries an O seal ring 104 and is secured to the lower end of a piston rod or plunger 105 slidable through the upper end of barrel 100. A compression spring 106, disposed about plunger 105 and confined between the top of barrel 100 and piston 103, normally holds piston 103 in its lowered or retracted position. A fork 107 fixed on the upper end of plunger 105 receives the other arm of head 96 of the rack bar 97.

Figures 7, 8:
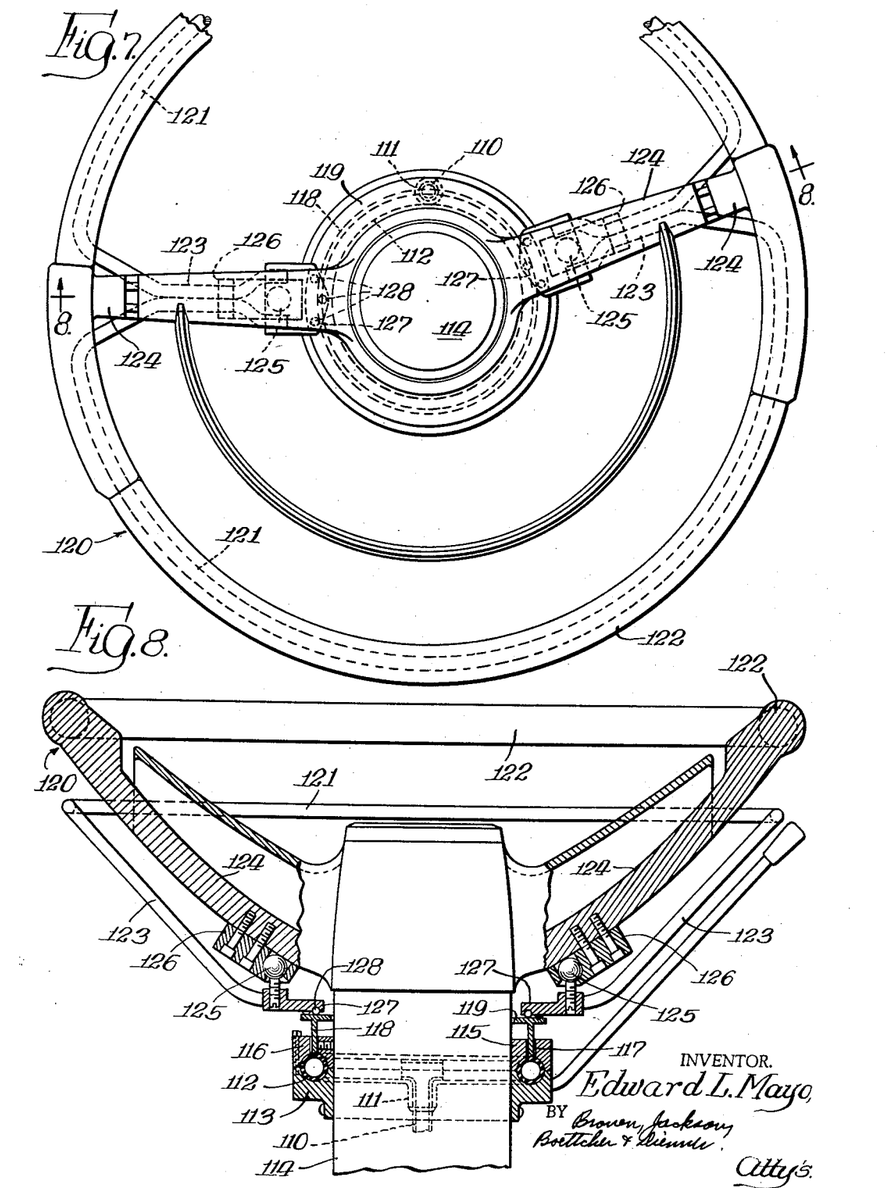
Figure 7 is a plan view of the steering column and wheel and associated parts of the hand operated brake control means.
Figure 8 is a sectional view taken substantially on line 8—8 of Figure 7, certain parts being shown in elevation.

The lower end of bellows 94 is connected by a small diameter tube 110 to a nipple 111 (Figure 8) of an annular rubber tube or reservoir 112 of substantially greater inner cross sectional area than the tube 110. The tube 112 seats in a corresponding recess in a lower annular collar 113 fixed on the steering column 114, which is disposed adjacent the brake pedal lever 77 and the accelerator pedal (not shown), as usual. An inner upper collar 115, also fixed on column 114 fits snugly about the inner upper portion of tube 112, and an outer upper collar 116, bolted to collar 113, fits about the outer upper portion of tube 112. The collars 115 and 116 are spaced apart defining between them an annular space or slot 117 which snugly receives an annular flange 118 of a ring 119 overlying collars 115 and 116, concentric with column 114 and movable lengthwise thereof. A steering wheel 120 of suitable type is rotatably mounted on the upper end of column 114 in a known manner. An annular operating member 121 underlies rim 122 of steering wheel 120 in proximity thereto and substantially concentric therewith. The operating member 121 has downwardly and radially inwardly extending arms 123 respectively underlying arms 124 of the steering wheel 120. Each of the arms 123 is pivotally mounted, adjacent its radially inner end, by ball and socket means 125, in a block 126 secured to the corresponding arm 124 of steering wheel 120. A pressure head 127, arcuate in plan, is secured to the inner end of each arm 123 of the operating member 121 in overlying relation to and adjacent ring 119. Antifriction members, conveniently bearing balls 128, seat in recesses adjacent the ends of head 127 and bear upon the upper face of ring 119. By pulling member 121 upward by the fingers, while grasping the steering wheel 120, the arms 123 may be tilted about the ball and socket connections effective for depressing ring 119 and thereby compressing the tube 112, but little effort being required due to the leverage advantage provided by the arms 123. The ring 119, tube 110 and bellows 94 are filled with oil or other suitable liquid. Accordingly, tilting of operating member 121 with resultant compressing of tube 112 is effective for extending the bellows 94 and causing upward movement of the corresponding fork 95, as will be clear from what has been said.

The hydraulic cylinder 99 is connected at its lower end, by means of a fitting 130 threaded into cap 101 and an associated small diameter tube 131, to a hydraulic cylinder 132 mounted on fire wall 74 to one side of and adjacent master cylinder 75. The cylinder 132 comprises a barrel 133 in which is slidably mounted a plunger 134 provided with a sealing O ring 135. An elongated cup 136 is secured to the outer or rearward end of plunger 134. The cup 136 receives a compression spring 137 confined between the inner end thereof and a head 138 slidable in cup 136 and normally held in its rearmost position by spring 137, rearward travel of head 138 being limited by screws 139 secured therein and extending through lengthwise slots in cup 136. Head 138 is secured on the forward end of a short connecting rod 140, to the rearward end of which is secured a substantially hemispherical head 141. Normally, piston 103 of hydraulic cylinder 99 is in retracted position, plunger 134 then being projected with head 141 in contact with the concaved forward face of a block or pad 142 fixed to the side of brake pedal lever 77. The hydraulic cylinder 99, tube 131 and hydraulic cylinder 132 are filled with oil or other suitable liquid. When the brake pedal lever 77 is depressed to a predetermined extent, for power braking, spring 137 resists compression to an extent effective for moving plunger 134 of cylinder 132 inward and thereby projecting plunger 105 of the hydraulic cylinder 99, as will be clear from what has been said. In the upward movement of plunger 105 fork 107 thereof contacts the other arm of head 96 of rack bar 97 thereby moving the latter upward.

Referring further to Figure 3, the upper nipple 44 of valve 21 is connected by conduit 145 and T fitting 146 to the source of suction or intake manifold 147 and the upper nipple 44 of valve 20 is also connected by conduit 148 and T fitting 146 to the intake manifold 147. The lower nipple 45 of valve 21 is connected by conduit 149 to nipple 68 secured to and opening into section 50 of the housing of motor 48. The lower nipple 45 of valve 20 is connected by conduit 150 to nipple 69 secured to and opening into section 49 of the housing of motor 48.

The master cylinder 75 is connected by conduits 151, 152 and 153, provided with appropriate fittings, to the usual wheel brake cylinders 154 of the automobile for transmitting braking pressure thereto.

A cam shaft 157 is rockably mounted in brackets 158 secured to plate 93 and has secured thereon two cams 159 and 160 disposed to contact the upper ends of the plungers 28 of valves 20 and 21, respectively. The cam shaft 157 is provided at one end thereof with a crank arm 161 to which is anchored one end of a tension spring 162 anchored at its other end to the adjacent bracket 158. Tension spring 162 normally holds crank arm 161 in contact with a lower stop 163 on a bracket 164 secured to plate 93, thereby holding the cam shaft 157 in such angular position that the high points of the cams 159 and 160 bear upon the upper ends of the plungers 28 of the valves 20 and 21, respectively. The tubular valve member 33 of each of the valves is then held in its fully lowered or depressed position shown in Figure 1, with its lower end seating on and closed by the disc valve member 40 and the latter spaced a material distance below its associated seat member 39. Both of the valves 20 and 21 are then opened to atmosphere and closed to the source of suction or intake manifold 147, both sections of the housing of motor 48 being then open to atmosphere and closed to suction thereby rendering the motor 48 ineffective. A spur gear 165 is secured on cam shaft 157 and meshes with rack bar 97 for turning cam shaft 157 in braking direction. In the normal position of cam shaft 157, rack bar 97 is in its fully lowered position with head 96 thereof in close proximity to the bottoms of the forks 95 and 107, which are of a height to extend a short distance above head 96 in the fully raised position of rack bar 97. An upper stop 166 on bracket 164 limits turning of the cam shaft 157 in brake applying direction.

The cam shaft 157 is turned clockwise, as viewed in Figures 9 and 10, for braking. That may be accomplished either by the hand control means or by depressing brake pedal lever 77. In hand control braking, the control member 121 is tilted upward thereby extending the bellows 94 and imparting upward movement to rack bar 97, as previously described, effective for turning cam shaft 157 in braking direction. In foot control braking, the brake pedal lever 77 is depressed without compressing spring 137 and is effective for forcing plunger 134 inwardly of cylinder 132. That projects plunger 105 of cylinder 99 causing upward movement of its associated fork 107 and, with it, the rack bar 97, thereby turning cam shaft 157 in braking direction, in the same manner as in hand control braking. The brakes may thus be controlled either by hand, or by foot, slot 87 permitting movement of brake pedal lever 77 relative to power lever 81 for that purpose, as above stated.

The cams 159 and 160 are so formed and disposed that at the start of the braking operation the valve member 33 of valve 20 is moved upwardly by springs 36 and 42, as permitted by cam 159, until the disc valve member 40 is seated, closing the air inlet port 38, and valve member 33 then moves upward a short distance away from the disc valve member 40 so as to be cracked open, thus establishing limited or restricted communication between section 49 of the housing of motor 48 and the intake manifold 147, by way of T fitting 146, conduit 148, nipple 44, opening 43 in valve member 33, valve member 33, nipple 45 and conduit 150 and nipple 69. While valve 20 is being closed to atmosphere and opened to suction under control of cam 159, valve 21 is also being closed to atmosphere under control of the cam 160. Immediately after valve 20 has been cracked open to suction, as above described, valve 21, now closed to atmosphere, is also opened to suction to a greater extent than valve 20, cam 160 being appropriately formed to that end. The suction in section 49 of the housing of motor 48 then acts as a drag in opposition to the suction in section 50 of the housing of motor 48, the suction in section 50 being somewhat greater than that in section 49 and effective for moving the diaphragm 55 of motor 48 in brake applying direction thereby swinging power lever 81 in counter-clockwise direction. That applies pressure to the master cylinder 75, which pressure is transmitted by way of conduits 151, 152 and 153 to the wheel brake cylinders 154 for applying the brakes. In the continued turning of cam shaft 157 in braking direction, the valves 20 and 21 are opened to increasing extent, the rate of opening of valve 21 being greater than that of valve 20, the cams 159 and 160 being appropriately formed to accomplish that result, so that a continued and increasing braking effect is obtained accompanied by the drag imposed by the suction or partial vacuum of increasing value in section 49 of the housing of motor 48 so that the braking is smooth and risk of abrupt stops is obviated. When the automobile is travelling at moderate speeds the valves 20 and 21 are not fully opened to suction and the full braking power is not available, though the braking power then available is adequate for stopping at such moderate speeds, and abrupt stops due to overbraking are avoided. When travelling at higher speeds, in excess of from 30 to 40 miles per hour, for example, the cam shaft 157 is turned in braking direction to such extent that plunger 28 of valve 20 is depressed to its lowermost position by lobe 159a of cam 159, cam 160 being then in such position as to clear the plunger 28 of valve 21. The valve 20 is then open to atmosphere and closed to suction, as shown in Figure 1, and the valve 21 is closed to atmosphere and opened to its fullest extent to suction. That renders available for braking the full power of the motor 48 adequate for quick or crash stops at the higher speeds, in case of emergency.

Figure 11:
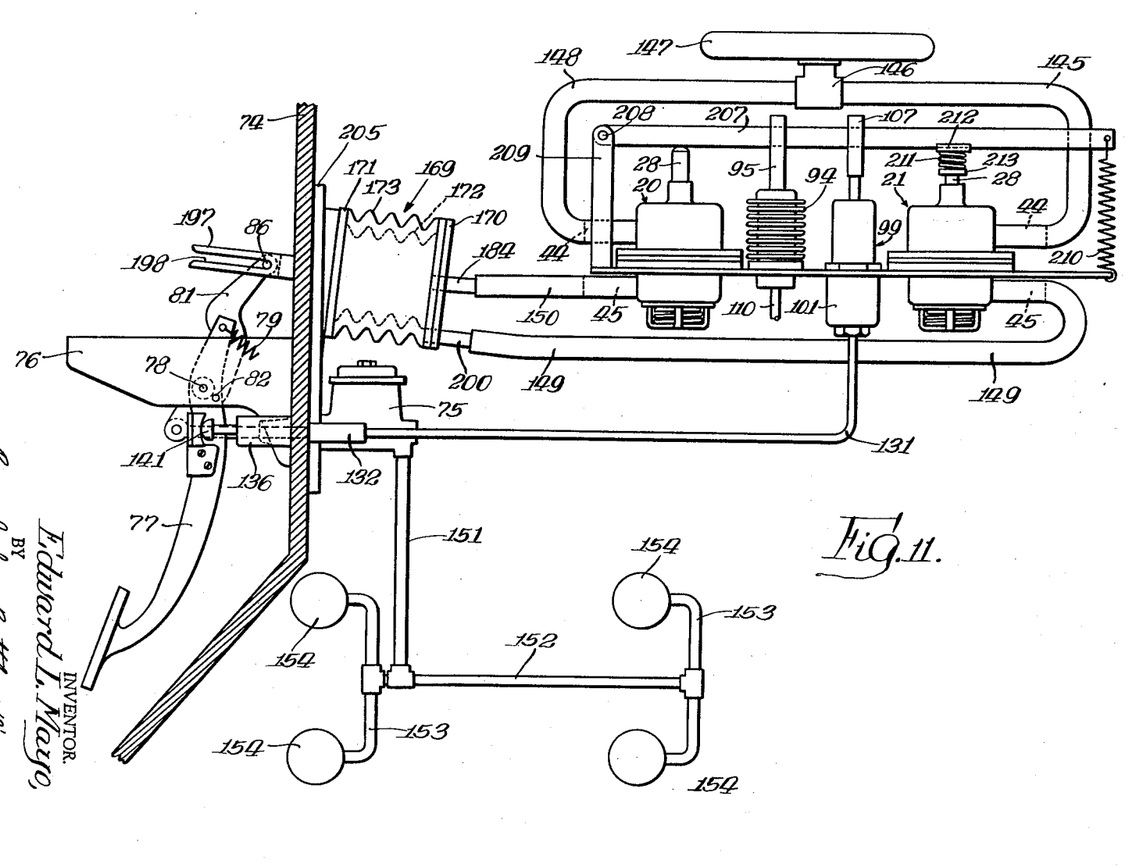
Figure 11 is a diagrammatic view of a modified form of braking system embodying my invention.
Figure 12:
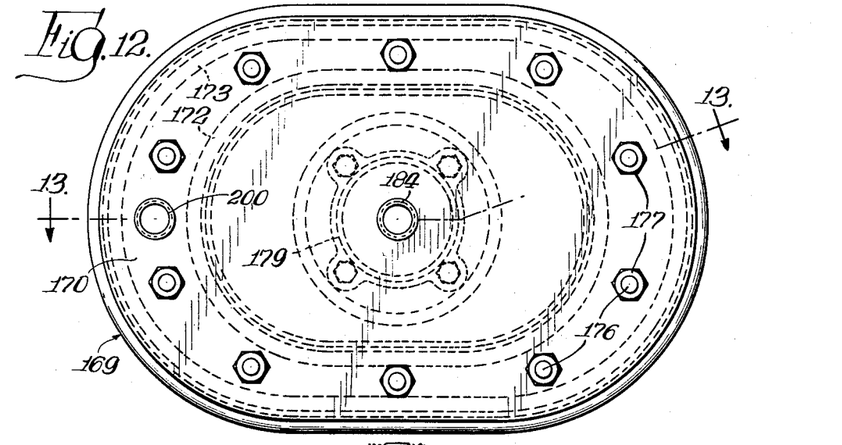
Figure 12 is a rear view of the suction power motor of the system of Figure 11.
Figure 13:
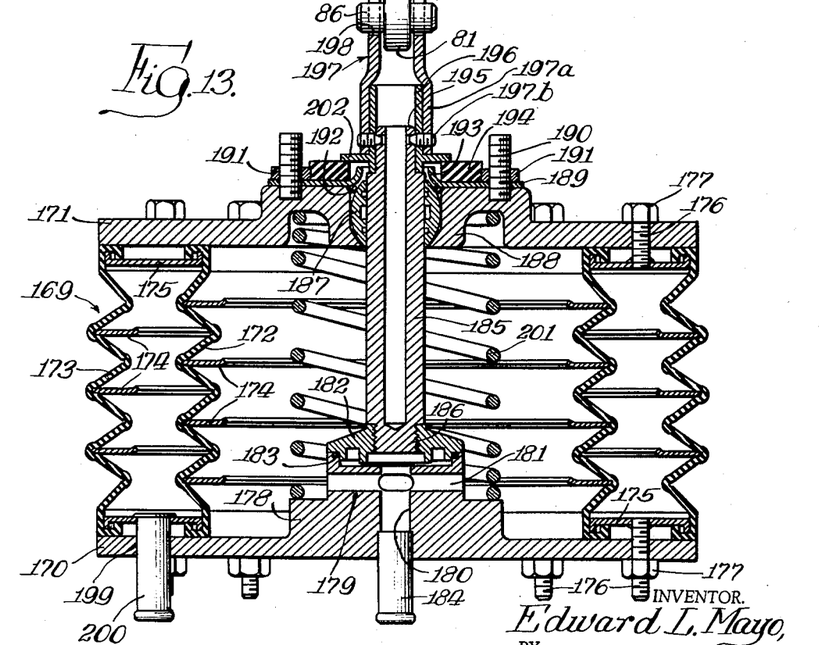
Figure 13 is a sectional view, on an enlarged scale, taken substantially on line 13—13 of Figure 12, certain parts being shown in elevation.

In the modified form of braking system shown in Figure 11 I use a different form of suction power motor 169 shown more clearly in Figures 12 and 13. It comprises front and rear heads 170 and 171, respectively, of elliptical shape spaced apart and connected together by inner and outer corrugated bellows walls 172 and 173, respectively, formed of rubber or other suitable material. Elliptical spreaders 174, conveniently formed of sheet metal, seat in the outwardly extending corrugations of the walls 172 and 173 to assure lengthwise folding and extension thereof without interference therebetween, in the operation of motor 169. The end portions of walls 172 and 173 are turned inward and are secured to heads 170 and 171, at the inner faces thereof, by channel clamp members 175. Screw studs 176, welded to clamp members 175, pass through heads 170 and 171 and receive nuts 177 effective for forcing the clamp members 175 toward heads 170 and 171 and tightly clamping thereto the end portions of walls 172 and 173. The front head 170 is provided with a central inwardly extending boss 178 of stepped formation, the inner portion 179 of which is of reduced diameter, and with an axial bore 180 and radial passages 181 extending from bore 180 and opening through the circumferential face of portion 179. The inner end of portion 179 of boss 178 is recessed for reception of a flanged cap 182 seating thereon and suitably secured thereto, conveniently by bolting, there being a sealing gasket 183 between cap 182 and portion 179 of boss 178. A nipple 184 is secured in the outer portion of bore 180 and communicates, by way of bore 180 and passages 181, with the space between the heads 170 and 171 and enclosed by the inner bellows wall 172. A tubular plunger 185 extends axially of motor 169 and is secured to cap 182 by means of a reduced screw stud 186, of continuous cross section, threaded into cap 182. Plunger 182 is slidable through a ball guide member 187 rockably mounted in a suitably recessed boss 188 extending inwardly from head 171 centrally thereof. Ball member 187 is held seated in boss 188 by a retainer 189, secured by screw studs 190 and nuts 191 to the outer face of head 171, and a rubber O seal ring 192 confined between retainer 189 and ball member 187 providing an air tight seal therewith. The radially inner portion of retainer 189 is bent rearwardly providing a rearwardly and outwardly inclined flange 193 overlying the recess in boss 188, to accommodate rocking movement of plunger 185 and ball member 187, for a purpose to be explained later. A rubber gasket 194 is mounted on the outer face of head 171 between flange 193 of retainer 189 and the screw studs 190. The rearward end portion of plunger 185 is reduced in exterior diameter to provide a reduced stud 195 and a contiguous exterior shoulder. Stud 195 fits snugly into a bushing 196 which fits into the forward end of a tubular neck 197a of a forked head 197. The stud 195, bushing 196 and neck 197a are suitably secured together, as by means of screws 197b. Each arm of head 197 is provided with a lengthwise slot 198 open at its rearward end, which slots 198 receive the end portions of cross pin 86, as before. Motor head 170 is provided, at its outer portion, with a bore 199 in which is secured a second nipple 200 opening, through bore 199 and clamp member 175, into the space between the two bellows walls 172 and 173. A compression spring 201, disposed about plunger 185 and seating at its forward end on boss 178 about portion 179 thereof and at its rearward end on head 171 about boss 188, normally holds motor 169 extended with plunger 185 thereof in its fully retracted position.

The power motor 169 is mounted on the forward face of fire wall 74 at a slight forward and downward inclination, as shown in Figure 11, conveniently by means of a suitably formed and recessed mounting plate 205 suitably secured, conveniently by welding, to fire wall 74. The plate 205 is provided with an opening (not shown) of somewhat greater diameter than an outer circumferential flange 202 of bushing 196, disposed to seat on gasket 194 in the fully retracted position of plunger 185, as shown in Figure 11. The opening in plate 205 is of less diameter than the outer diameter of gasket 194 and head 171 of motor 169 conveniently is secured to plate 205 by means of the screw studs 190 and nuts (not shown) threaded thereon at the rear face of plate 205. The gasket 194 thus serves as a cushion between plate 205 and head 171 while also cushioning the movement of head 197, by means of flange 202, in the movement of plunger 185 to its fully retracted position.

Referring further to Figure 11, the control valves 20 and 21 are mounted on plate 93, with the bellows or Sylphon 94 and the hydraulic cylinder 99 between them and also mounted on plate 93, as before. A valve control lever 207 is pivoted at one end, at 208, to the upper end of a bracket 209 bolted to valve plate 93. A tension spring 210, anchored at its upper end to the other end of lever 207 and at its lower end to plate 93, normally holds lever 207 in its lowered position shown. A compression spring 211 seats at its upper end in a cup 212 secured to lever 207 adjacent the lower edge thereon, the lower portion of spring 211 being disposed about the upper portion of plunger 28 of valve 21 and spring 211 seating at its lower end on a collar 213 secured on plunger 28. Valve control lever 207 is disposed in vertical alignment with the plungers 28 of control valves 20 and 21. In its normal lowered position lever 207 holds plunger 28 of valve 20 in its lowermost position and also maintains compression spring 211 under compression effective for holding plunger 28 of valve 21 in its lowermost position. Both of the valves 20 and 21 are then fully open to atmosphere, as previously explained. The forks 95 and 107 of the bellows 94 and the hydraulic cylinder 99, respectively, extend upward about control lever 207 the lower edge of which, in its normal position shown in Figure 11, is disposed in closed proximity to the bottoms of the forks.

The upper nipple 44 of control valve 20 is connected to intake manifold 147 by way of conduit 148 and T fitting 146, and the lower nipple 45 thereof is connected by conduit 150 to nipple 184 of the power suction motor 169. The upper nipple 44 of control valve 21 is connected to manifold 147 by conduit 145 and T fitting 146, and the lower nipple 45 thereof is connected by conduit 149 to nipple 200 of suction power motor 169. The ends of cross pin 86 of the motor power lever 81 fit snugly, but not tightly, in the slots 198 in the arms of head 197 of the plunger of motor 169. Braking may be effected under either hand control or foot control, as desired. Assuming the hand control is used, when the bellows 94 is extended, in the manner above described, the control lever 207 is moved upward about its pivot in opposition to the tension spring 210. During such upward movement of lever 207 plunger 28 of control valve 20 moves upward until that valve is closed to atmosphere. Thereafter, in the continued upward movement of lever 207, valve 20 is opened to suction to increasing extent, with nipple 184 of motor 169 in communication with intake manifold 147. The resultant suction within the inner bellows wall 172 causes movement of head 170 toward head 171 by atmospheric pressure and projects plunger 185 thereby turning the power lever 81 in braking direction, as will be understood from what has been said. The maximum braking power rendered available by fully opening valve 20 to suction, corresponds to the area of head 170 of motor 169 enclosed by the inner bellows wall 172, and is adequate for braking at moderate speeds. During opening of control valve 20 to suction, valve 21 is maintained closed to suction and open to atmosphere and when control valve 20 is fully opened to suction and closed to atmosphere, valve 21 is closed to both atmosphere and suction and then conditioned to be opened to suction if required.

If additional braking power is desired, as when travelling at high speeds, bellows 94 is further extended so as to continue upward movement of control lever 207 after valve 20 has been fully opened to suction, lever 207 then being out of contact with plunger 28 of valve 20. When lever 207 reaches the point in its upward travel at which valve 20 is fully open to suction, valve 21 is closed to atmosphere, compression spring 211 then being relieved of compression. Thereafter, in the continued upward movement of lever 207 valve 21 is opened to suction to increasing extent, until it is open to suction to its maximum extent, if desired, valve 20 remaining fully open to suction. In that manner substantial additional braking power, corresponding to the area of head 170 of motor 169 between the bellows walls 172 and 173 is rendered available, adequate for braking at high speeds. It will be seen that for braking at moderate speeds part only of the total power of motor 169 is rendered available, adequate for such speeds, and oversensitivity and overbraking due to having available excessive braking power is avoided. This is conducive to smooth braking and the avoidance of abrupt stops when driving in traffic at low or at moderate speeds. In power braking under foot control the operation is the same as when braking under hand control, except that braking is initiated by foot pressure, as will be explained presently, and is effected by depressing the brake pedal lever 77.

As previously noted, compression spring 137 is comparatively stiff and effective for forcing plunger 134 of hydraulic cylinder 132 inward when the brake pedal lever 77 is depressed. Inward movement of plunger 134 projects plunger 105 of the hydraulic cylinder 99. In the upward movement of plunger 105, the control lever 207 is moved upward about its pivot, in opposition to tension spring 210, and valve 20 closes, as before. Further upward movement of control lever 207 results in opening valve 20 to suction to increasing extent while maintaining it closed to atmosphere, with corresponding increase in available braking pressure. When valve 20 is fully opened to suction the atmospheric pressure exerted upon the area of head 170 of motor 169 enclosed by the inner bellows wall 172 is then available for braking, and is the maximum braking pressure rendered available by opening valve 20 to suction. That pressure is adequate for braking at moderate speeds. During opening of control valve 20 to suction, valve 21 is maintained closed to suction and open to atmosphere until valve 20 is fully open to suction, at which time valve 21 is closed to both atmosphere and suction being then conditioned to be opened to suction if required.

If additional braking power is desired, as when travelling at high speeds, plunger 134 is moved a further distance inward by increased pressure on the brake pedal lever 77, further projecting plunger 105 of the hydraulic cylinder 99, with corresponding further upward movement of control lever 207. In the continued upward movement of lever 207 control valve 21 opens to suction to increasing extent until, if desired, it is fully open to suction, valve 20 remaining fully open to suction. That renders available substantial additional braking power, corresponding to the area of head 170 of motor 169 between the bellows walls 172 and 173, the total power of motor 169 being then available for braking. In emergency, as in the case of imminent collision, the total braking power of the motor 169 may be supplemented by foot pressure on the brake pedal 77. After the plunger of hydraulic cylinder 99 has been projected to its maximum extent, further pressure on brake pedal lever 77 compresses spring 137 (Figure 5) and turns brake pedal lever 77 relative to power lever 81, as permitted by slot 87, until finger 88 contacts the lower arm of lever 81. Thereafter, further pressure on the brake pedal lever 77 is transmitted to the master cylinder 75 supplementing the braking pressure exerted on that cylinder by the power motor. Also, in hand control braking, the braking pressure exerted by the power motor may, in an emergency, be supplemented by foot pressure on the brake pedal lever 77 in the same manner as when braking under foot control, as just described.

Figure 14:
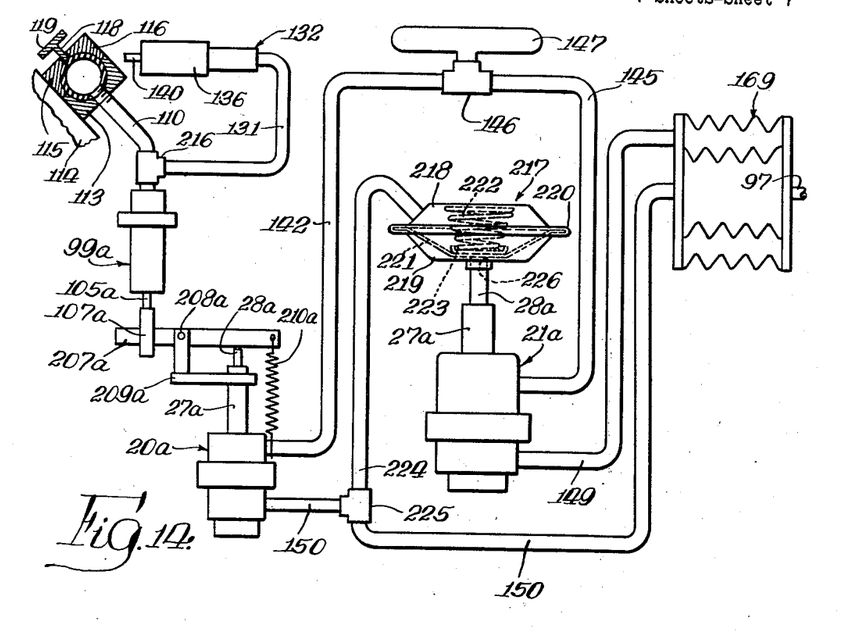
Figure 14 is a diagrammatic view of the power motor and associated control valves and operating means therefor of a second modified form of braking system embodying my invention.
Figure 15:
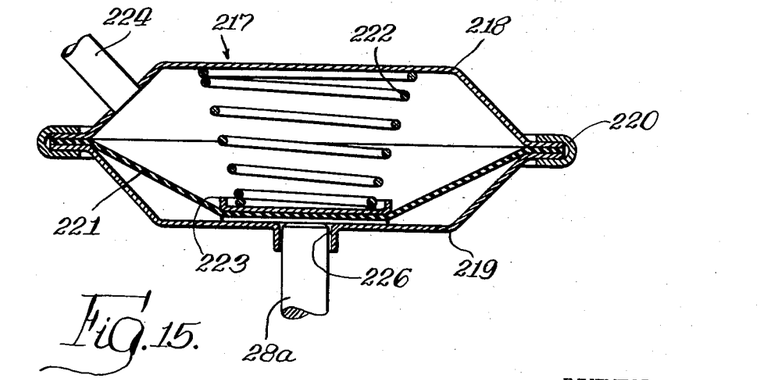
Figure 15 is an axial sectional view, on an enlarged scale, of the control valve operating motor of Figure 14, certain parts being shown in elevation.

The modification shown in Figures 14 and 15, is, in general, similar to that of Figure 11 but is particularly suited to hand control in certain aspects. Conduit 110 is connected by T 216 to conduit 131, which is connected to the hydraulic cylinder 99a as before. Fork 107a, secured on plunger 105a of hydraulic cylinder 99a receives one arm of a lever 207a pivoted at 208a on a bracket 209a secured on neck 27a of control valve 20a. A tension spring 210a, anchored to valve 20a and to lever 207a normally holds the other arm thereof depressed in pressure contact with plunger 28a of valve 20a effective for normally maintaining the latter open to atmosphere and closed to suction, as before. The control valve 21a also normally is held open to atmosphere and closed to suction, by a suction operated control motor 217, shown more clearly in Figure 15.

Referring to Figure 15, the motor 217 comprises a housing formed in two flanged sections 218 and 219 secured together in any suitable manner, as by means of a clamp ring 220, with a diaphragm 221 of any suitable material clamped between them. A compression spring 222 is confined between the top or outer wall of section 218 and seats at its inner end in a shallow cup 223 seating on the upper face of diaphragm 221. The motor 217 comprises an upper suction chamber, connected by conduit 224 and T fitting 225 to conduit 150, and a lower chamber provided with a central opening 226. The opening 226 loosely receives the upper end portion of plunger 28a of control valve 21a. The compression spring 222 is of proper strength normally to hold plunger 28a depressed so as to maintain control valve 21a fully open to atmosphere and closed to suction, while permitting closing of control valve 21a to atmosphere and opening thereof to suction to desired extent subsequent to opening of control valve 20a to suction to its maximum extent, as will appear more fully presently.

In the braking system of Figure 14, the power motor 169 and the rod 140 are connected to the motor power lever 81 and to the brake pedal lever 77, in the same manner as in Figure 11, as will be understood. In braking, either by hand control or by foot control, plunger 105a of the hydraulic cylinder 99a is projected so as to turn lever 207a to desired extent in counterclockwise direction. During such movement of lever 207a control valve 20a is first closed to atmosphere and is thereafter opened to suction to desired extent to produce the desired braking effect, as previously described. Connecting control valve 20a to suction also connects the suction chamber of motor 217 to suction by way of T 225 and conduit 224. The compression spring 222 is effective for maintaining control valve 21a open to atmosphere and closed to suction until valve 20a has been opened to suction to nearly its maximum extent. As valve 20a approaches its full open to suction position diaphragm 221 of motor 217 is moved by suction, in opposition to spring 222, away from valve 21a an extent such that valve 21a is closed to atmosphere. That occurs shortly in advance of valve 20a being fully opened to suction. Thereafter, as valve 20a is fully opened to suction in the continued movement of lever 207a, the resultant increased suction in motor 217 overcomes the compression spring 222 and moves the diaphragm 221 a further distance such that control valve 21a is opened to suction while remaining closed to atmosphere. The additional area of head 170 of the power motor 169 then becomes available and provides substantial additional braking power, as previously described. By providing the motor 217 the operation of valve 21a is rendered automatic and is effected by power derived from the suction source, so that but slight effort is required to utilize the full braking power of the system, which is thus well suited for hand control braking. If desired, the entire braking operation, from minimum to maximum power, may be performed by means of the brake pedal lever 77, as will be understood from what has been said. In either case, the actuation of control valve 21a, for maximum braking power, is automatic and is effected by power derived from the suction source. In the system of Figure 14, as in that of Figures 3 and 11, a substantial portion of the total braking power is rendered unavailable for braking at moderate speeds and may be rendered available as required for braking at higher speeds. That avoids overbraking and sudden stops at moderate speeds, due to there being then available substantially more braking power than required with resultant oversensitivity in braking, and is conducive to smooth and even braking. By providing for either hand control or foot control, in the braking systems shown by way of example, I assure that the driver's foot may be utilized for operating the accelerator pedal while braking under hand control, rendering available engine power for maneuvering out of a skid, when braking on wet or slippery surfaces, desirable for obvious reasons.

In the several forms of my invention shown, the diaphragm or movable wall of the braking power motor is moved in braking direction by atmospheric pressure and a portion only, or the total amount, of such pressure may be utilized for braking to suit requirements. In the system of Figure 3 the diaphragm 55 of motor 48 is moved in braking direction by the atmospheric air trapped in chamber or section 49 of motor 48, when braking at moderate speeds, as the suction in section 50 increases in the continued opening of control valve 20 to suction. A portion only of the total possible pressure exertable by diaphragm 55, representing a corresponding portion of the power of motor 48 is then used for braking. Then control valve 20 is open to atmosphere and control valve 21 is connected to suction, the total possible pressure of the diaphragm 55 becomes available and the maximum power of motor 48 may then be utilized for braking. In each of the forms shown in Figures 11 and 14 a portion only of the total area of the movable wall or head 170 of the braking power motor 169, corresponding to a portion only of the total power thereof, is utilized for braking at moderate speeds, and the full area of head 170, corresponding to the full power of the motor 169, is used for braking at the higher speeds, as above described.

As will be understood from what has been said, in the several forms of my invention shown herein the components of the braking means may be disposed and mounted in any suitable manner as desired or as circumstances may require. The brake pedal and the master cylinder are at all times available for braking purposes if desired or in the event of failure of the power motor or of the control means therefor, as stated above.

It will be understood that changes in detail may be resorted to without departing from the field and scope of my invention, and I intend to include all such variations as fall within the scope of the appended claims, in this application in which the preferred forms only of my invention have been disclosed.

I claim:

1. In automobile power brake means, wheel brake means, a master cylinder connected to said wheel brake means for transmitting braking pressure thereto, a suction operated power motor having a wall connected to said master cylinder movable in one direction for exerting pressure on said master cylinder and movable in the opposite direction for relieving pressure on said master cylinder, the area of said wall being such as to provide by atmospheric pressure thereon maximum power adequate for braking to a stop at higher speeds of travel, a suction source, and control means effective for connecting said motor at opposite sides of said wall to suction with the suction at one side of said wall increasing relative to the suction at the other side thereof effective for moving said wall in said one direction, for braking at lower speeds of travel, and for connecting said motor at said other side of said wall to atmosphere while maintaining it connected to suction at said one side of said wall, for braking at higher speeds of travel.

2. In automobile power brake means, wheel brake means, a master cylinder connected to said wheel brake means for transmitting braking pressure thereto, a suction operated power motor having a wall connected to said master cylinder movable in one direction for exerting pressure on said master cylinder and movable in the opposite direction for relieving pressure on said master cylinder, the area of said wall being such as to provide by atmospheric pressure thereon maximum power adequate for braking to a stop at higher speeds of travel, a suction source, a first control valve normally open to atmosphere connected to said suction source and to said motor at the one side of said wall corresponding to said opposite direction of movement thereof, a second control valve normally open to atmosphere connected to said suction source and to said motor at the other side of said wall corresponding to said one direction of movement thereof, and means for closing said valves to atmosphere and connecting them to suction with the rate of connection to suction of said second valve increasing relative to said first valve thereby connecting said motor to suction at opposite sides of said wall and moving the latter in said one direction by the increasing suction at said other side thereof under control of the lesser suction at said one side of said wall.

3. In automobile power brake means, wheel brake means, a master cylinder connected to said wheel brake means for transmitting braking pressure thereto, a suction operated power motor having a wall connected to said master cylinder movable in one direction for exerting pressure on said master cylinder and movable in the opposite direction for relieving pressure on said master cylinder, the area of said wall being such as to provide by atmospheric pressure thereon maximum power adequate for braking to a stop at higher speeds of travel, a suction source, a first control valve normally open to atmosphere connected to said suction source and to said motor at the one side of said wall corresponding to said opposite direction of movement thereof, a second control valve normally open to atmosphere connected to said suction source and to said motor at the other side of said wall corresponding to said one direction of movement thereof, and means for closing said valves to atmosphere and connecting them to suction with the rate of connection to suction of said second valve increasing relative to said first valve thereby connecting said motor to suction at opposite sides of said wall and moving the latter in said one direction by the increasing suction at said other side thereof under control of the lesser suction at said one side of said wall, said last mentioned means being effective for opening said first valve to atmosphere when said second valve has been opened to suction to substantially maximum extent for rendering available the maximum power of said motor for braking at higher speeds of travel.

4. In automobile power brake means, wheel brake means, a master cylinder connected to said wheel brake means for transmitting braking pressure thereto, a suction operated power motor having a wall connected to said master cylinder movable in one direction for exerting pressure on said master cylinder and movable in the opposite direction for relieving pressure on said master cylinder, the area of said wall being such as to provide by atmospheric pressure thereon maximum power adequate for braking to a stop at higher speeds of travel, a suction source, a first control valve normally open to atmosphere connected to said suction source and to said motor at one side of said wall corresponding to said opposite direction of movement thereof, a second control valve normally open to atmosphere connected to said suction source and to said motor at the other side of said wall corresponding to said one direction of movement thereof, and means for closing said valves to atmosphere with said first valve closing in advance of said second valve and connecting them to suction with the rate of connection to suction of said second valve increasing relative to said first valve thereby connecting said motor to suction at opposite sides of said wall and moving the latter in said one direction by the increasing suction at said other side thereof under control of the lesser suction at said one side of said wall.

5. In automobile power brake means, wheel brake means, a master cylinder connected to said wheel brake means for transmitting braking pressure thereto, a suction operated power motor having a movable wall presenting two separate areas and connected to said master cylinder and movable in one direction for exerting pressure thereon and in the opposite direction for relieving pressure on said master cylinder, a suction source, a first motor control valve normally open to atmosphere and adjustable for connecting one of said areas of said wall to suction to variable extent, and a second motor control valve normally open to atmosphere actuated responsive to adjustment of said first valve and effective for connecting the other area of said wall to suction to variable extent subsequent to connection to suction of said first area of said wall, the suction applied to said areas of said wall when both thereof are connected to suction being effective for moving said wall in said one direction.

6. In automobile power brake means, wheel brake means, a master cylinder connected to said wheel brake means for transmitting braking pressure thereto, a suction operated power motor having a movable wall exposed to atmosphere at one side and provided at its other side with two separate areas, said wall being connected to said master cylinder and movable in one direction for exerting pressure thereon and in the opposite direction for relieving pressure on said master cylinder, a first motor control valve normally open to atmosphere and adjustable for connecting one of said areas of said wall to suction to variable extent effective for moving said wall in said one direction, and a second motor control valve actuated responsive to adjustment of said first valve and effective for connecting the other area of said wall to suction when said first valve is open to suction to substantially maximum extent, the suction at said other area of said wall being effective for moving the latter in said one direction and supplementing the suction at said one area providing therewith increased braking power of said motor.

7. In automobile power brake means, wheel brake cylinders, a master cylinder connected to said wheel brake cylinders for transmitting pressure thereto, a suction operated power motor, a power lever connected to said motor and master cylinder for transmitting pressure from the former to the latter, said lever being movable independently of said motor for applying pressure to said master cylinder, a suction source, manually operated means for connecting said motor to suction, a brake pedal lever, supplementary means operable by said brake pedal lever for connecting said motor to suction, and a lost motion connection between said power lever and said brake pedal lever effective for moving said power lever in pressure applying direction in the movement of said brake pedal lever beyond a predetermined extent in braking direction, said supplementary means including lost motion means accommodating movement of said brake pedal lever in braking direction beyond said predetermined extent effective for braking by foot pressure alone without actuation of said supplementary means.

8. In automobile power brake means, wheel brake cylinders, a master cylinder connected to said wheel brake cylinders for transmitting pressure thereto, a suction operated power motor, a power lever connected to said motor and master cylinder for transmitting pressure from the former to the latter, a suction source, a first motor control valve normally open to atmosphere and adjustable for connecting said motor to suction to variable extent, a second motor control valve normally open to atmosphere and adjustable for connecting said motor to suction to variable extent, manually operated means for closing said first valve to atmosphere and opening it to suction to increasing extent and thereafter closing said second valve to atmosphere and opening it to suction to increasing extent, a pedal brake lever, and means operable by said brake lever for closing said first valve to atmosphere and connecting it to suction to increasing extent and thereafter closing said second valve to atmosphere and opening it to suction to increasing extent.

9. In automobile power brake means, wheel brake cylinders, a master cylinder connected to said wheel brake cylinders for transmitting pressure thereto, a suction operated power motor having a movable head exposed at one side to atmosphere and provided at its other side with means providing two areas separated one from the other, connections between said movable head and said master cylinder for exerting pressure on the latter in the movement of said head responsive to suction, a suction source, a first motor control valve normally open to atmosphere and connected to one of said areas of said head for normally connecting said one area to atmosphere and for closing it to atmosphere and connecting it to suction to variable extent, a second motor control valve normally open to atmosphere and connected to the other area of said head for normally connecting said other area to atmosphere and for closing it to atmosphere and connecting it to suction to variable extent, and means for operating said valves selectively and for opening said first valve to suction to maximum extent and thereafter opening said second valve to suction to maximum extent while maintaining said first valve open to suction to maximum extent.

10. In automobile power brake means, wheel brake cylinders, a master cylinder connected to said wheel brake cylinders for transmitting pressure thereto, a suction operated power motor having a movable head exposed at one side to atmosphere and provided at its other side with means providing two areas separated one from the other, connections between said movable head and said master cylinder for exerting pressure on the latter in the movement of said head responsive to suction, a suction source, a first motor control valve normally open to atmosphere and connected to one of said areas of said head for normally connecting said one area to atmosphere and for closing it to atmosphere and connecting it to suction to variable extent, a second motor control valve normally open to atmosphere and connected to the other area of said head for normally connecting said other area to atmosphere and for closing it to atmosphere and connecting it to suction to variable extent, manually operated means for operating said valves selectively and for opening said first valve to suction to maximum extent and thereafter opening said second valve to suction to maximum extent while maintaining said first valve open to suction to maximum extent, a brake pedal lever, and means actuated by said brake pedal lever for operating said valves in the same manner as by said manually operated means.

11. In automobile power brake means, wheel brake cylinders, a master cylinder connected to said wheel brake cylinders for transmitting pressure thereto, a suction operated power motor having a movable head exposed at one side to atmosphere and provided at its other side with means providing two areas separated one from the other, connections between said movable head and said master cylinder for exerting pressure on the latter in the movement of said head responsive to suction, a suction source, a first motor control valve normally open to atmosphere and connected to one of said areas of said head for normally connecting said one area to atmosphere and for closing it to atmosphere and connecting it to suction to variable extent, a second motor control valve normally open to atmosphere and connected to the other area of said head for normally connecting said other area to atmosphere and for closing it to atmosphere and connecting it to suction to variable extent, and means for operating said valves selectively and for opening said first valve to suction to maximum extent and thereafter automatically opening said second valve to suction to maximum extent while maintaining said first valve open to suction to maximum extent.

12. In automobile power brake means, wheel brake cylinders, a master cylinder connected to said wheel brake cylinders for transmitting pressure thereto, a suction operated power motor having a movable head exposed at one side to atmosphere and provided at its other side with means providing two areas separated one from the other, connections between said movable head and said master cylinder for exerting pressure on the latter in the movement of said head responsive to suction, a suction source, a first motor control valve normally open to atmosphere and connected to one of said areas of said head for normally connecting said one area to atmosphere and for closing it to atmosphere and connecting it to suction to variable extent, a second motor control valve normally open to atmosphere and connected to the other area of said head for normally connecting said other area to atmosphere and for closing it to atmosphere and connecting it to suction to variable extent, a suction operated valve motor controlling said second valve and normally holding it open to atmosphere, and connections between said first valve and said valve motor effective for connecting the latter to suction and thereby closing said second valve to atmosphere and opening it to suction responsive to opening of said first valve to suction to maximum extent.

References Cited in the file of this patent

UNITED STATES PATENTS

| 747,772 | Rickman | Dec. 22, 1903 |
| 1,834,368 | Arbuckle | Dec. 1, 1931 |
| 2,471,244 | Self | May 24, 1949 |
| 2,497,438 | Butler | Feb. 14, 1950 |
| 2,649,169 | Holman | Aug. 18, 1953 |
| 2,762,396 | Fawick | Sept. 11, 1956 |
| 2,840,044 | Carrion | June 24, 1958 |